United States Patent [19]
Nakayama et al.

[11] Patent Number: 6,081,265
[45] Date of Patent: Jun. 27, 2000

[54] SYSTEM FOR PROVIDING A SAME USER INTERFACE AND AN APPROPRIATE GRAPHIC USER INTERFACE FOR COMPUTERS HAVING VARIOUS SPECIFICATIONS

[75] Inventors: Yoshiyuki Nakayama; Emiko Yanagisawa, both of Kawasaki; Minoru Koizumi, Yokohama; Naomichi Nonaka, Kawasaki; Katsumi Hanashima, Nakamachi, all of Japan

[73] Assignee: Hitachi, Ltd., Tokyo, Japan

[21] Appl. No.: 08/919,618

[22] Filed: Aug. 28, 1997

[30] Foreign Application Priority Data

Aug. 30, 1996 [JP] Japan .................................. 8-229691

[51] Int. Cl.⁷ ...................................................... G06F 3/00
[52] U.S. Cl. .......................................................... 345/329
[58] Field of Search ..................................... 345/329, 332, 345/335, 333, 334, 340, 342, 346; 395/200.33, 200.31, 682; 709/201, 203, 302

[56] References Cited

U.S. PATENT DOCUMENTS

| | | | |
|---|---|---|---|
| 5,179,700 | 1/1993 | Aihara et al. | 345/326 |
| 5,280,583 | 1/1994 | Nakayama et al. | 395/200.35 |
| 5,557,726 | 9/1996 | Yoshizawa | 345/332 X |
| 5,627,977 | 5/1997 | Hickey et al. | 345/329 |
| 5,692,141 | 11/1997 | Kamisango et al. | 345/329 |
| 5,764,235 | 6/1998 | Hunt et al. | 345/329 X |
| 5,889,516 | 3/1999 | Hickey et al. | 345/333 |

OTHER PUBLICATIONS

*The X Resource*, "Xme and Xy —Scalable Window Sharing and Mobility or from X Protocol Multiplexing to X Protocol Multicasting", C. Bormann, et al., Issue 9, 8th Annual X Technical Conference, pp. 205–210.

*Primary Examiner*—Crescelle N. dela Torre
*Attorney, Agent, or Firm*—Antonelli, Terry, Stout & Kraus, LLP

[57] ABSTRACT

A method or system to change a display output by a program without modifying the program. The invention also provides a program or computer to accomplish this change in display output. The invention intercepts and converts a graphics display command into the desired configuration and also performs reverse conversion of input data in compliance with computer environment assumed from the program. Additionally the invention converts data exchanged between the program and computer system mutually as needed.

38 Claims, 10 Drawing Sheets

MAIN PROCESSING FLOW

PROCESSING THE DISPLAY OUTPUT GRAPHICS COMMAND

PROCESSING OF INPUT DATA GENERATE NOTICE

PROCESSING FOR CONVERSION OF CUSTOM COORDINATES

GUI CONVERSION AT OPTIONAL PERIODS

FIG. 11

| AP FONT | COMPUTER A FONT | COMPUTER B FONT | COMPUTER C FONT |
|---|---|---|---|
| FONT-0 | FONT-0-A | FONT-0-B | FONT-0-C |
| FONT-1 | FONT-1-A | FONT-1-B | FONT-1-C |
| AP CODE | COMPUTER A CODE | COMPUTER B CODE | COMPUTER C CODE |
| CODE-0 | CODE-0-A | CODE-0-B | CODE-0-C |
| CODE-1 | CODE-1-A | CODE-1-B | CODE-1-C |
| CODE-2 | CODE-2-A | CODE-2-B | CODE-2-C |

230

SYSTEM FOR PROVIDING A SAME USER INTERFACE AND AN APPROPRIATE GRAPHIC USER INTERFACE FOR COMPUTERS HAVING VARIOUS SPECIFICATIONS

CROSS REFERENCE TO RELATED APPLICATIONS

This application is related to application Ser. No. 07/968,046, filed Oct. 28, 1992, now abandoned, and applicaton Ser. No. 07/938,593, filed Sep. 3, 1992, now U.S. Pat. No. 5,280,583, the disclosures of which are incorporated herein by reference.

BACKGROUND OF THE INVENTION

This invention relates to graphic user interface system (hereinafter GUI) provided for the user by the computer program in order to change the size of or the content the window of the display.

Previously remote control (U.S. Pat. No. 4,939,509) and application program (hereinafter AP) sharing (U.S. Pat. No. 5,195,086) are known as technologies of the field. The remote control method allows operation of a separate computer by another computer and is frequently utilized for such tasks as network control. The entire screen image of the computer being remotely controlled was displayed on the other computer which directly implement operating commands.

The AP sharing method allows users in separate locations to perform collaborative simultaneous operation by means of one AP user interface with one effective function providing a desktop conference system. Both of the above methods have the object of showing the contents of the display unit of one computer, unchanged onto the display unit of the other computer.

In the above mentioned technology; screen image management by computer (remote control method) and the AP sharing of display outputs are performed as is onto the other computer. Consequently the problem arises that the screen image on one display unit is different from that on the computer that originally sent the screen image. For instance, in terms of pixel units, a display unit having a resolution of 640×480 might not hold the whole image of a display unit having a resolution of 1280×1024. In such a case, the operator of the computer with the smaller display unit must scroll the display in order to see the entire image.

SUMMARY OF THE INVENTION

Therefore, this invention has the object of providing a method to change the display output without modifying the existing program, and also providing a program or computer to accomplish this change in display output.

Another object of this invention is to provide a method for changing the display configuration according to the computer and particular circumstances when utilizing a user interface to show an image transferred from one computer onto another computer, and also to provide a computer or a program to achieve this method.

To resolve the above problems, the system of this invention conforms to the display output operation of the computer program utilizing the display output graphics command to correct the generated display graphics command to match the computer display screen to which the graphic output is to be directed and the display unit. Further, the input data loaded by the user via the input unit connected to the computer on which its image display is to be shown, is corrected so as to adapt to the configuration of the input data programmed for that computer.

BRIEF DESCRIPTION OF THE DRAWINGS

The present invention will be more apparent from the following detailed description, when taken in conjunction with the accompanying drawings, in which:

FIG. 11 is a view showing one example of a conversion table contained in this system 200.

DETAILED DESCRIPTION OF THE PREFERRED EMBODIMENTS

An embodiment of this invention is described while referring to the following drawings.

Figure 1:
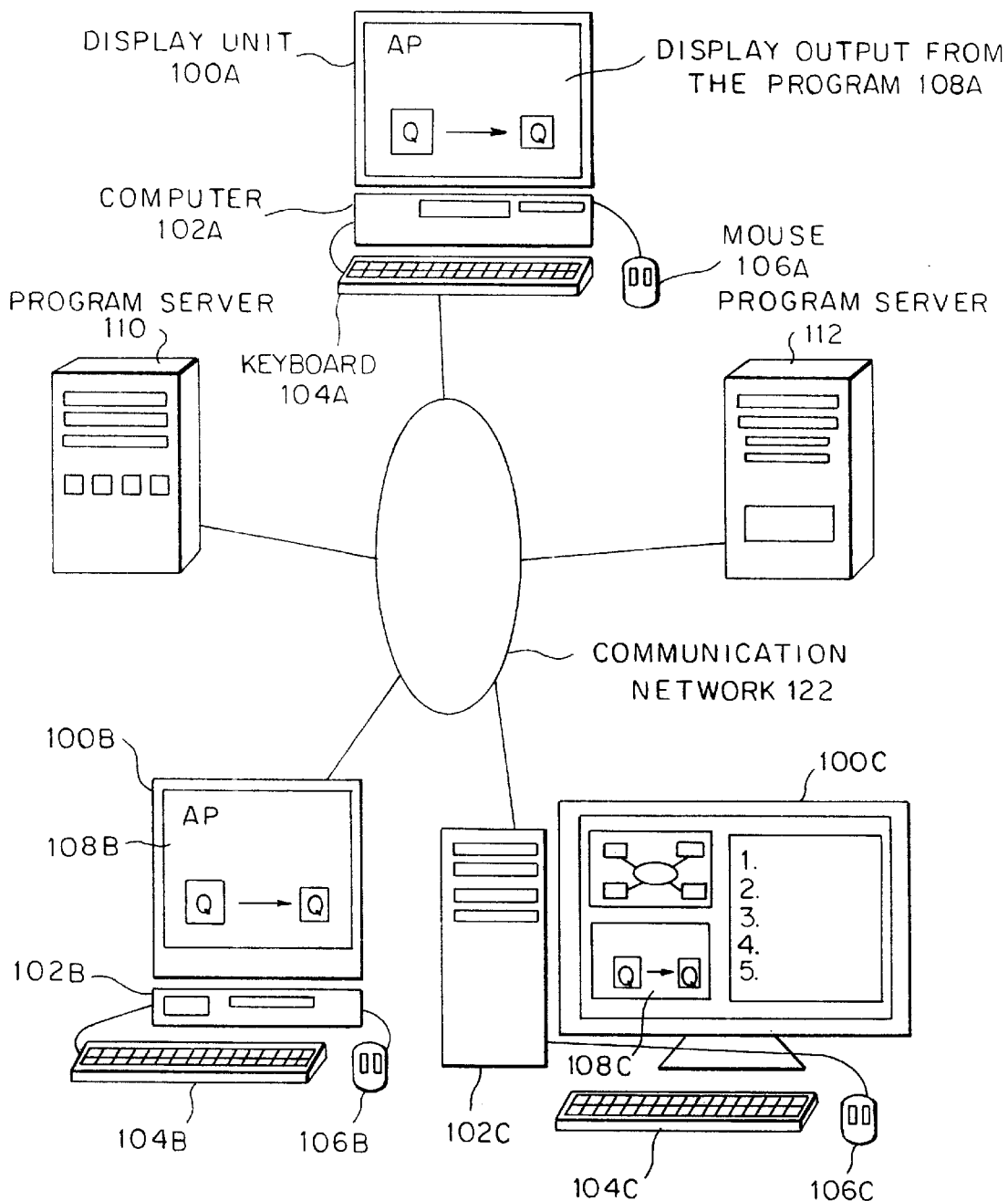
FIG. 1 is a drawing showing the structure and the effect of the system in the embodiment of this invention.

FIG. 1 shows the structure and effect of this embodiment. This invention converts GUI of a target program to another GUI. The target program is placed on a program server 110 and run. If this invention is not utilized, the program input and outputs are implemented through a computer 102A. The display output is made to appear on a display unit 100A for the user. The inputs may be conveyed to the target program in the program server 110 by user operation of a letter code input unit such as a keyboard 104A or by means of a pointing device such as a mouse 106A on a display unit 100A. This embodiment utilizes a separate computer linked to the program server 110 and the computer 102A by a communication network 122. However these may be installed in one computer. The program to implement this invention is placed in a program server 112. Just as the case with the program server 110, there are no particular restrictions on whether or not to provide this invention in a separate computer.

The functions of this invention are described as follows. In routine operation as above, the target program input and outputs are implemented through the computer 102A. Next, the specifications of the display screen for the target program and the handling of input data are emulated on the display unit 100A, the keyboard 104A and mouse 106A. In other words, the resolution of the display unit 100A, the code issued by the keyboard 104A and the number of buttons of the mouse 106A depend on the specifications of the display screen for the target program and the handling of input data.

This invention enables input/output at the computers 102B and 102C which have input/output devices with different specifications from that of the computer 102A, without changing the computer which executes the target program. For example, as shown in the FIG. 1, the graphics shown on the display unit 100A are converted to a different aspect ratio to be displayed on the display unit 100B. In the computer 102C, the display output of the target program is reduced in size and displayed on the display 100C. This would be performed for instance, in order to refer to the target program for obtaining reference information on another job.

Another possible way of using is to change the computer handling the input and outputs from the computer 102A to the computer 102C. In such a case, the display output of the target program of the computer 102C is reduced in size and installed in the display 100C. This would be performed for instance, in order to refer to the target program for obtaining reference information on another job.

In many cases as in FIG. 1, the input window and the output window are integrated into one window. However in the system of this invention, a separate input window and output window can be formed. As will be made clear from the subsequently related description of the software configuration, the target program of this invention can easily handle a plurality of respective programs. Furthermore, a plurality of computers 102 can be provided to handle inputs and outputs of one target program and the respective display output from the one target program can be shown on the display unit 100 in a suitable format; and the input and output data of the input and output units 104 and 106 from the respective computers 102 can of course be displayed in a suitable format by means of the target program. This method is effective when a plurality of users from different computer environments must perform a cooperative task while observing the same one program.

Figure 2:
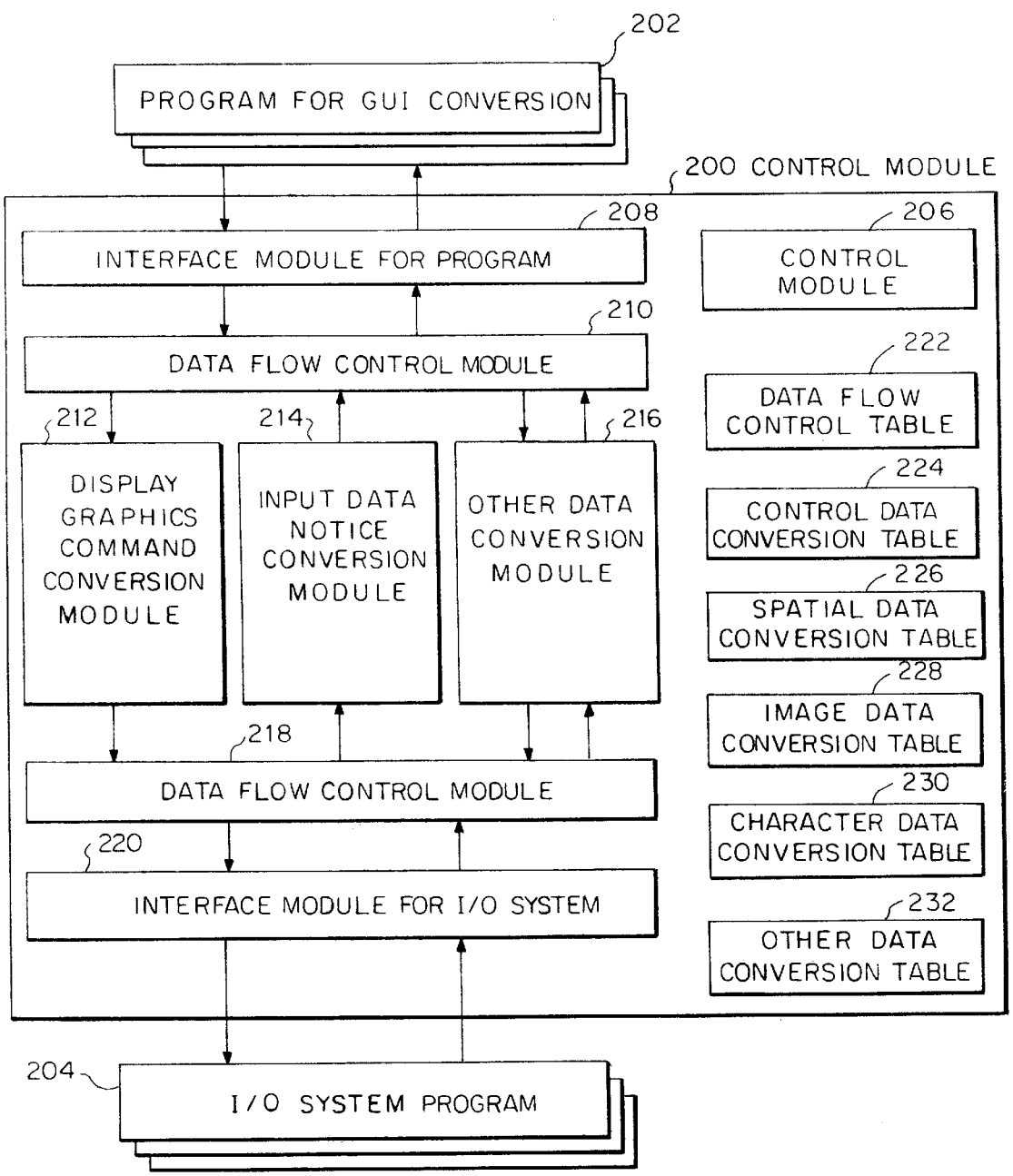
FIG. 2 is a block diagram showing the software configuration of the embodiment of this invention.

FIG. 2 illustrates the software configuration of this embodiment. Reference numeral 200 denotes the program module and tables. This is referred to as "this system" or "this program".

In this system 200, the inputs and outputs of the GUI target program 202 are implemented on computers 102A, B, C provided with the I/O system program 204. Window system or input/output driver devices are available as the I/O system program 204. An interface module 208 provides an interface with the target program. An I/O system interface module 220 provides an interface with the I/O system program.

When the GUI target program 202, this system 200 or the I/O system program 204 are installed in different computers, a module 208 or a module 220 provide a communications function by means of a communication network 122. The main data that this system 200 receives from the GUI target program 202 is a graphics command specifying the display output. On the other hand, the main data that this system 200 receives from the I/O system program 204 is notice of generation of input data.

Besides the above, attention must also be paid in this system for instance to data exchanges between the GUI target program 202 and the I/O system program 204 for reporting window placement changes or keyboard status timing. The processing method when this data is received or sent is determined by the data flow control modules 210 and 218. These data flow control modules 210 and 218 index a data flow control table 222.

The display output graphics command is processed by a graphics conversion model 212. The input data notice is processed by an input data notice conversion module 214. Other data is processed by a data conversion module 216.

A coordinate data conversion table 224, spatial data conversion table 226, image data conversion table 228, a character data conversion table 230 and data conversion table 232 are indexed in order to perform the above processing. The coordinate data conversion table 224 is indexed so that the coordinate system emulated by the target program 202 and the I/O system 204 can be converted with actual coordinate system. The spatial data conversion table 226 is indexed so geometric quantities such as line length and line thickness can be converted. The image data conversion table 228 is indexed for conversion methods such as image conversion and for matching the color and gray scale. The character data conversion table 230 is indexed for conversion of the code system between the actual inputs provided by the input system emulated by the target program 202 and the I/O system 204. The data conversion table 232 for other data is indexed for conversion of other than the above data.

These conversion table can be utilized for instance to enhance objects on the screen or make them flash, or change the type of language or terms shown on the display. A control module 206 performs overall control of this system 200 by such tasks as starting up and ending the system and GUI conversion.

Figure 3:
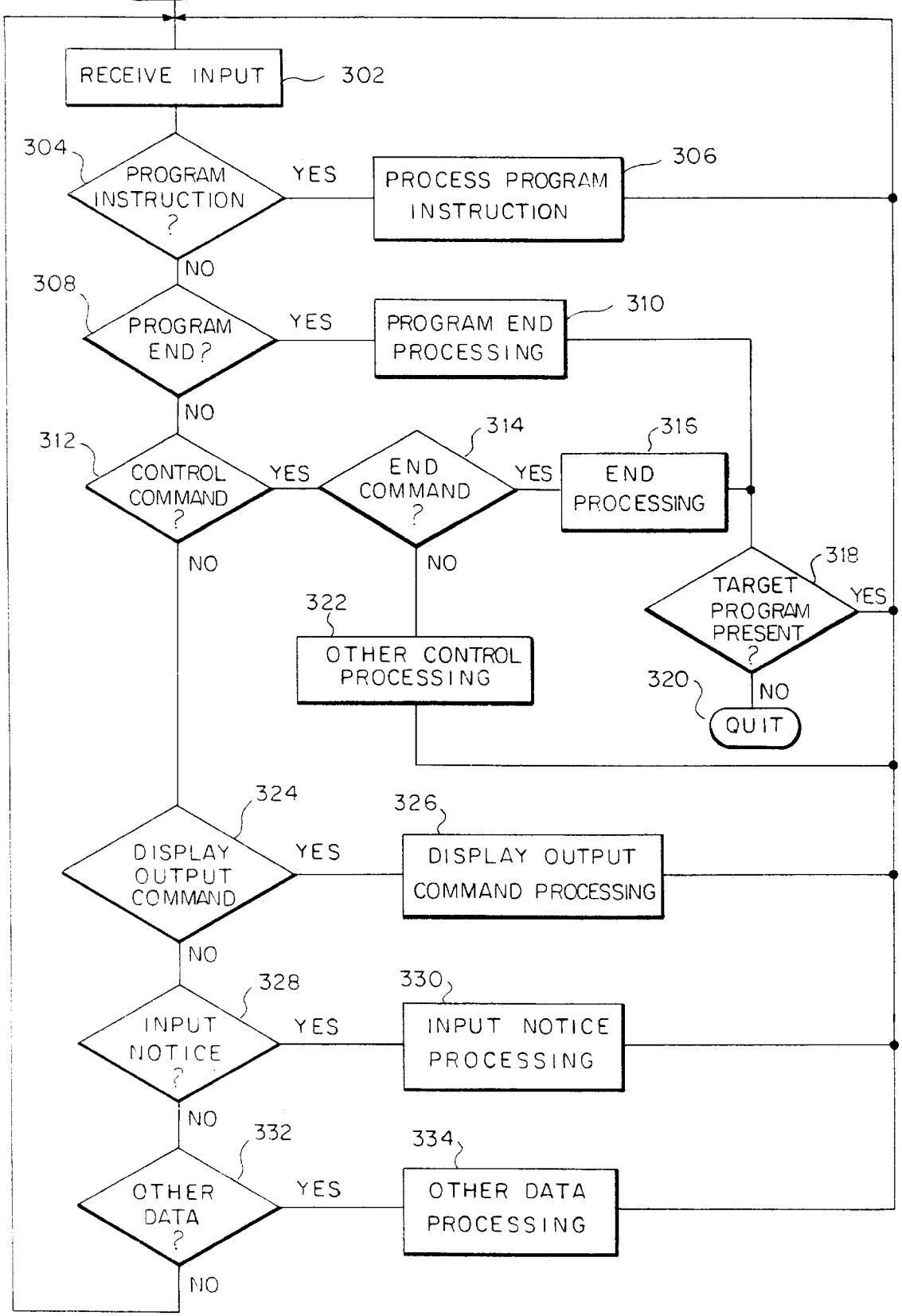
FIG. 3 is a flow chart showing essential section of the processing of the embodiment of this invention.

FIG. 3 is a view showing the main operation flow in the processing in this embodiment.

Figure 10:
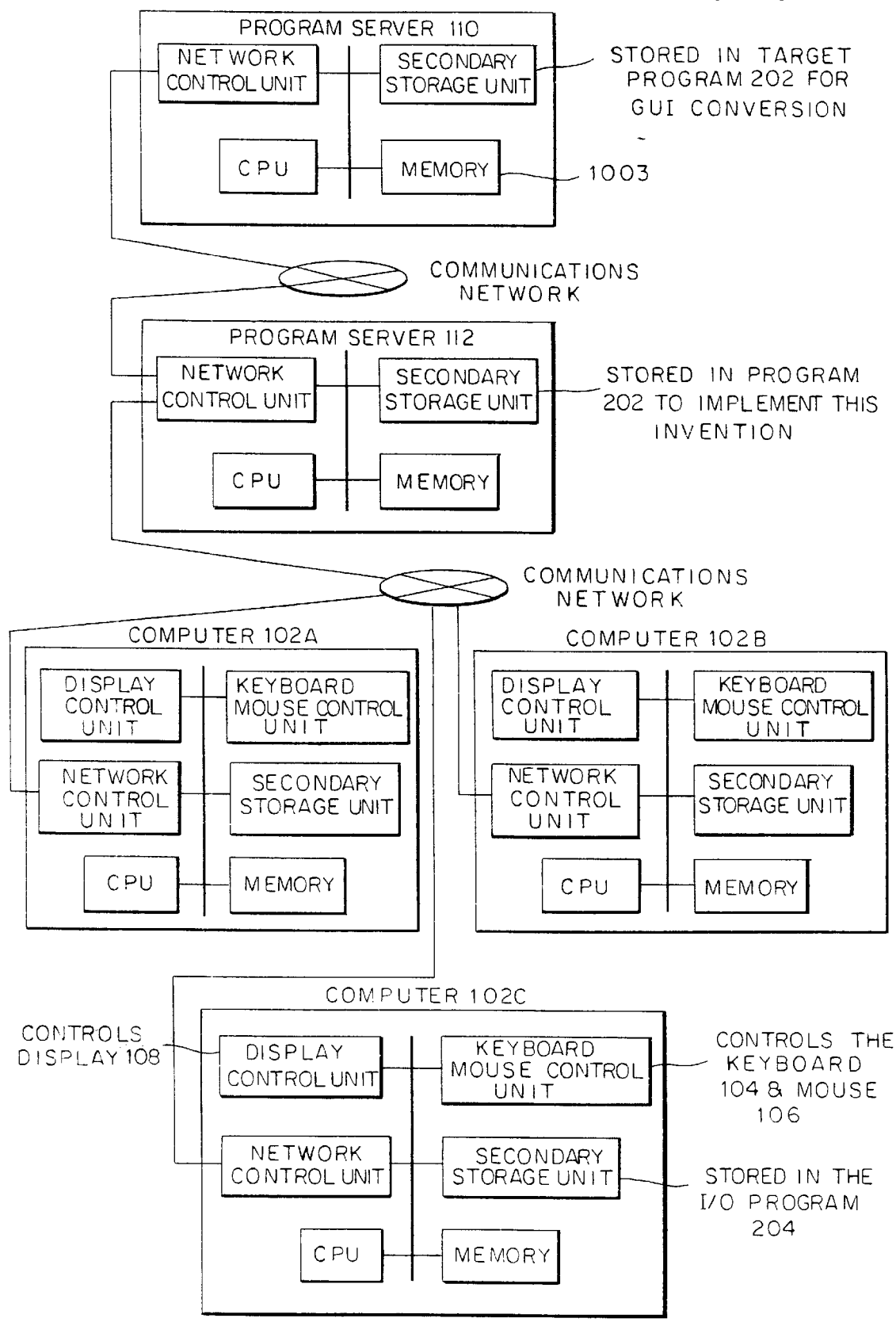
FIG. 10 is a overall hardware block diagram of the structure shown in FIG. 1.

FIG. 10 shows the concept block diagram for each of the computers shown in FIG .1. A CPU1001 in FIG. 10, implements the processing of FIG. 3 by executing the program 200 stored in a main memory 1003 or a secondary memory device 1002. The program 200 may also be retrieved from a storage medium such as floppy, ROM, etc or from a storage of a server connected to a network which is connected to the computers, and stored in the main memory 1003 or the secondary memory device 1002.

In FIG. 3, the control module 206 and the interface modules 208 and 220 receive data from (302 on drawing) from the I/O system 204, the GUI target program 202 and the user. When the user selects this program 202 and (304) the control module 206 performs the instructed program processing for connecting program 202 with the interface module 208 (306). When the user quits program 202 (308), the control module 206 ends GUI conversion processing (310) for the specified program 202. If other control commands (312) from the control module 206 issue quit commands for program 202 (314), then the program 202 is ended and connections to the interface modules 208 and 220 are turned off. Once execution of this program 202 is stopped (318) the system 200 may be ended (320) but it can also remain started. Display graphics command processing is performed (326) when the graphic display command (324) is input from the received data (302). When the input data notice (328) is received from the data (302) then processing of input data commences (330). When the received data (302) belongs to another data type (332) the data is respectively processed as required (334).

Figure 4:
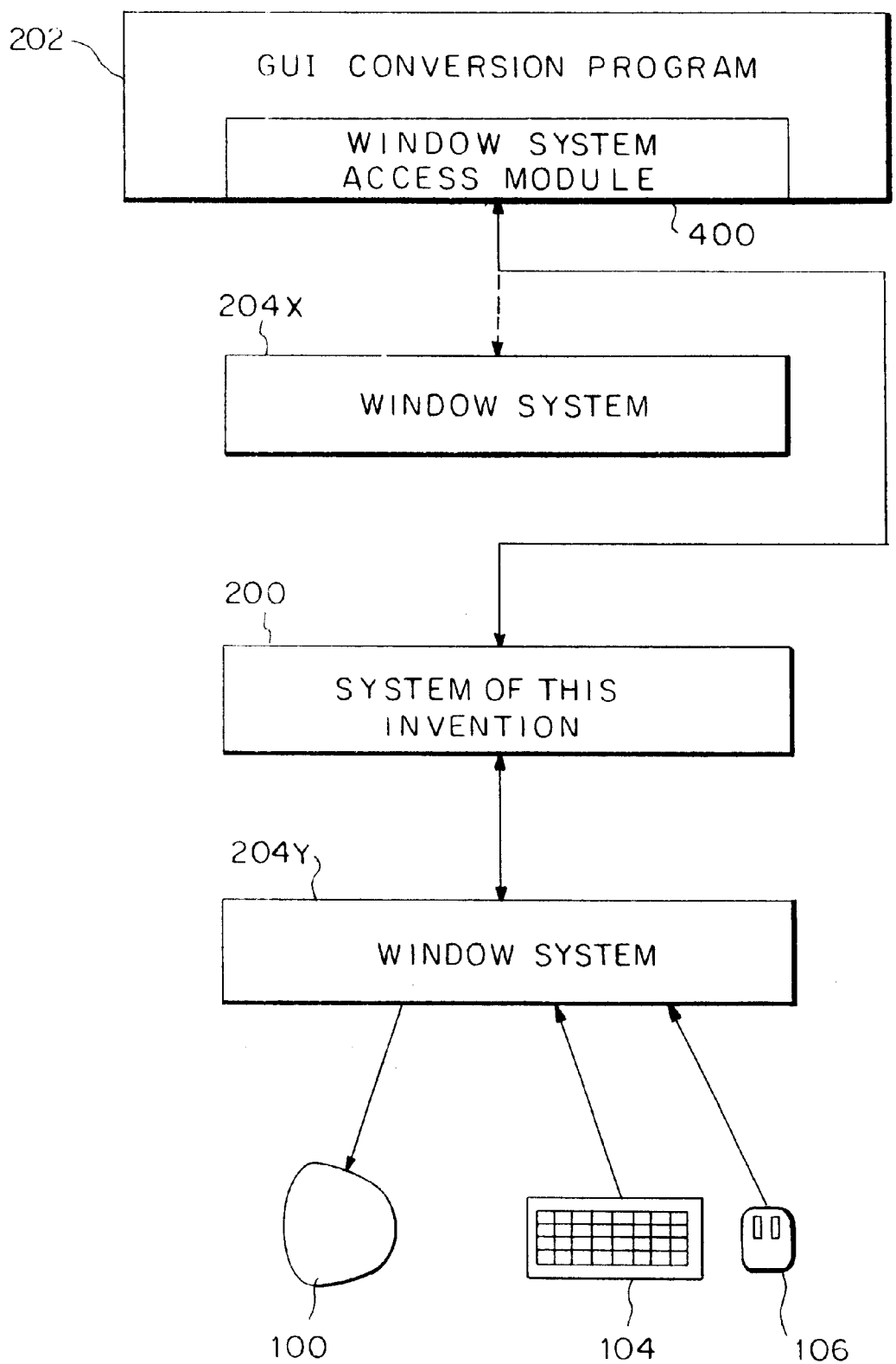
FIG. 4 is a view showing a method for utilizing the window system interface for implementing this embodiment.
Figure 5:
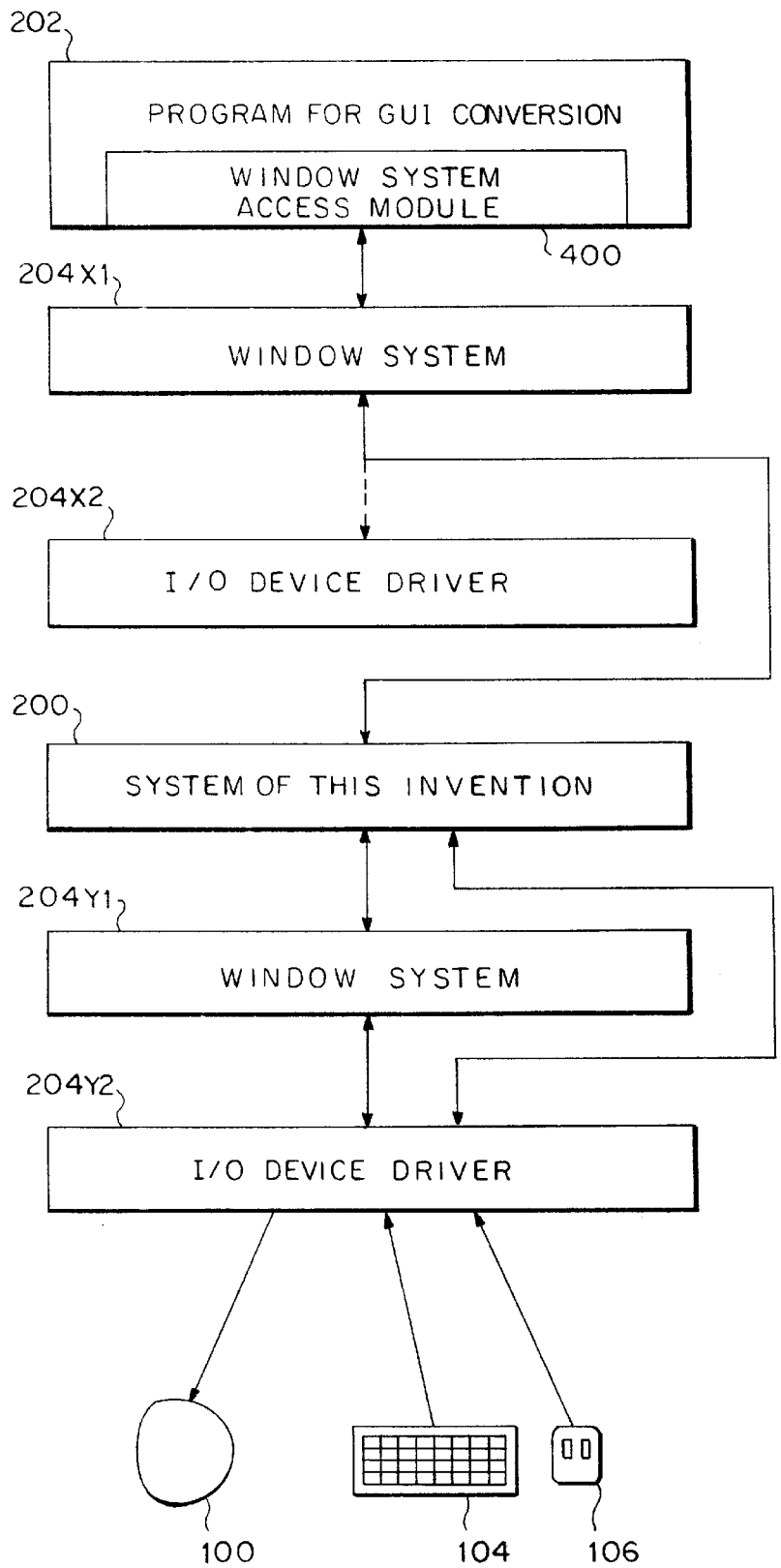
FIG. 5 is a view showing a method for utilizing the input/output device interface for implementing this embodiment.

The input/output data for the target program 202 must be obtained in order to operate the system 200. FIGS. 4 and 5 show in two methods the position rankings in this system 200 to obtain and use this data.

FIG. 4 illustrates a method for achieving this embodiment by utilizing a window system interface. The computer system for use with the program 202 is installed with the window system 204 and also has a window system access module 400 for accessing the window system.

In typical operation, the window system 204X (which operates according to program server 110 and computer 102A above) of a particular computer is accessed by the access module 400. In the present invention the system 200, when it is in operation, acts as a simulated window system for the application program 202 by a function of the interface module 208 in the system 200.

On the other hand, the system 200 simulates the application program for the window system 204Y (for instance 102B and 102C mentioned previously) which was originally designed to implement inputs and outputs for program 202. In the present invention the interface module 220 is designated as the program module with which the window system 204 should be connected.

Thus this system 200 manipulates data that is supposed to be exchanged between the conversion program 202 and the window system 204 in the case of utilizing the window system interfaces.

FIG. 5 shows the method for achieving this embodiment by utilizing the input/output device interface. The operation that program 202 requests of the computer by way of the window system 204X1 is implemented on the I/O devices corresponding to each of the I/O drivers 204X2. The operation instructed from the program 202 can also be implemented on other computers by obtaining data that should be exchanged between the I/O device driver 204X2 and the window system 204X1. This data is then sent to the I/O device driver 204Y2 of the computer whose that must be have the inputs and outputs to implement the task from the program 202. These I/O device drivers 204X2 and 204Y2 need not be identical so the data taken from the drivers and window systems may be transferred to the window system 204Y1 so that a system with a wide range of adaptability can be achieved.

The differences when the window system interface is used and when the I/O device driver interface is used are as follows. The data utilized for a window system interface is implemented on the precondition that there is a corresponding window, so a window system of the same type must be operating on the computer I/O side. Also, since this is window-based data, operation of separate window unit is not difficult to accomplish on the computer I/O side.

On the other hand, when utilizing an I/O device interface, data handled by this system 200 is not window-based or window dependent and only provides image commands and physical coordinate values on the display unit 100. The frame and title added by the window system will therefore also be changed. However this system 200 does not handle processing for the window which gives the advantages that the type of window system on the I/O side of the computer is not critical and a window system need not always be provided.

Figure 6:
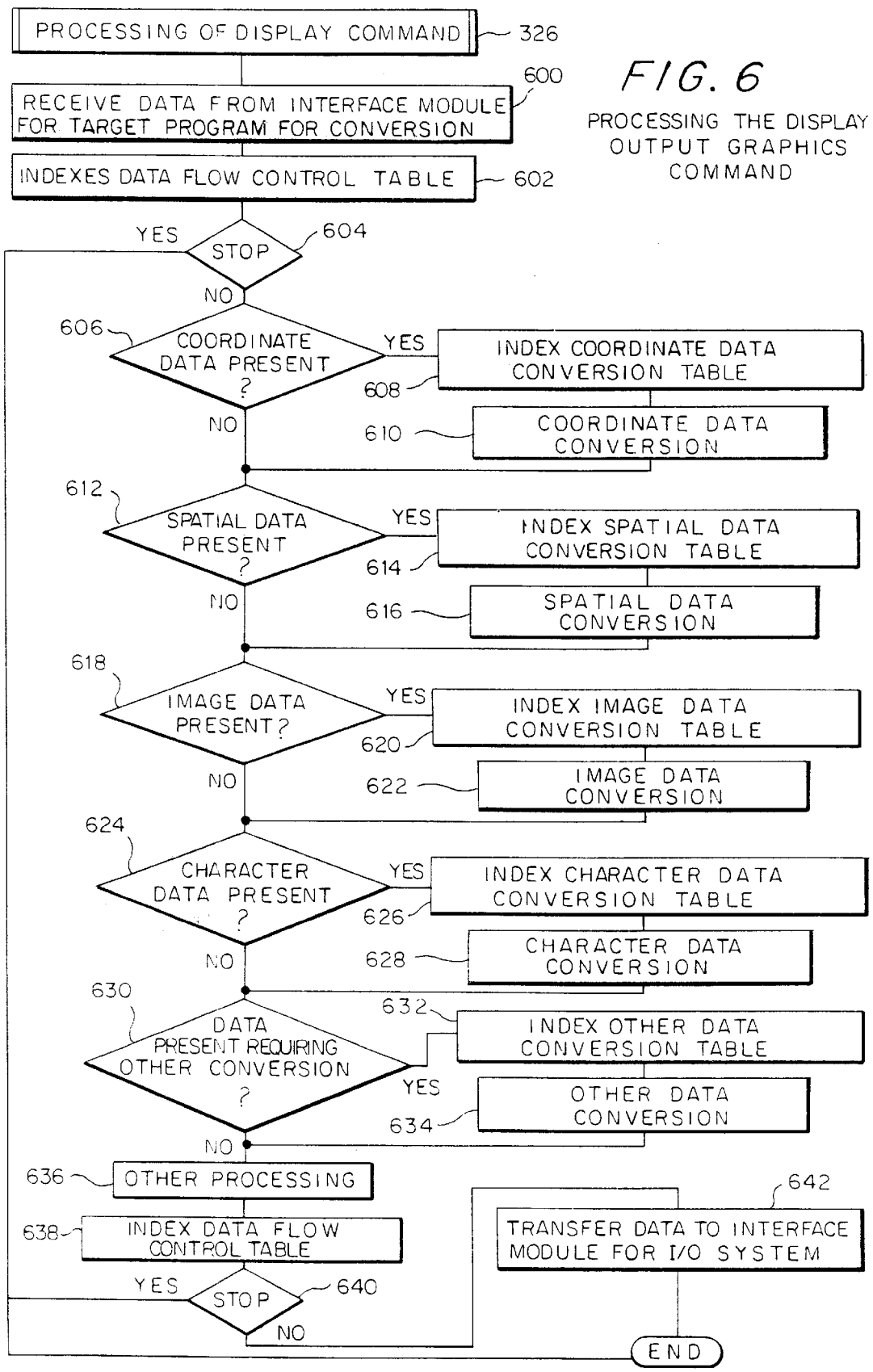
FIG. 6 is a flow chart showing the method for processing the display output graphics command.

The method by which this system 200 processes display output graphics commands is shown in the flow chart of FIG. 6.

First, the display output graphics command is received from the interface module 208 for the target program (600). The data flow control table 222 (602) is indexed to determine the process sequence. Once the process sequence is determined (604) the subsequent display graphics commands are analyzed. When the command includes coordinate data (606), the coordinate data conversion table 224 is indexed (608) and that coordinate data is converted according to the indexing results (610). When the command includes spatial data (612), the spatial data conversion table 226 is indexed (614) and the spatial data then converted according to these results (616). When the command includes image data (618), the image data conversion table 228 is indexed (620) and the image data then converted according to those results (622). When the command includes character data (624), the image data conversion table 230 is indexed (626) and the image data then converted according to those results (628). When this command includes other required data (630), the other data conversion table 232 is indexed (632) and the data then converted according to those results (634).

FIG. 11 shows a typical character data conversion table 230. This is one example of a table for conversion of character data in this embodiment for displaying an output of computers 100A, B and C. The reason this conversion is required is that character types with different sizes are preferred.

When the GUI target program 202 uses the Font-0, the Fonts-0, A,B,C are used on the respective computers. In the above example font conversion is defined for the two types of fonts used by the program 202. This font conversion data can also be used for conversion and reverse conversion of the font name returned after an inquiry of the font being used in the computer A.

This table also defines the conversion for the code. A key code having an identical meaning may possibly differ between the program 202 emulation and the various computers.

When the above conversion is complete other necessary processing is performed (636). Thus the data flow control table 222 is indexed (638) and when further processing is set (640), the display output graphics command is transferred (642) to the I/O system side of the interface module 220.

Figure 7:
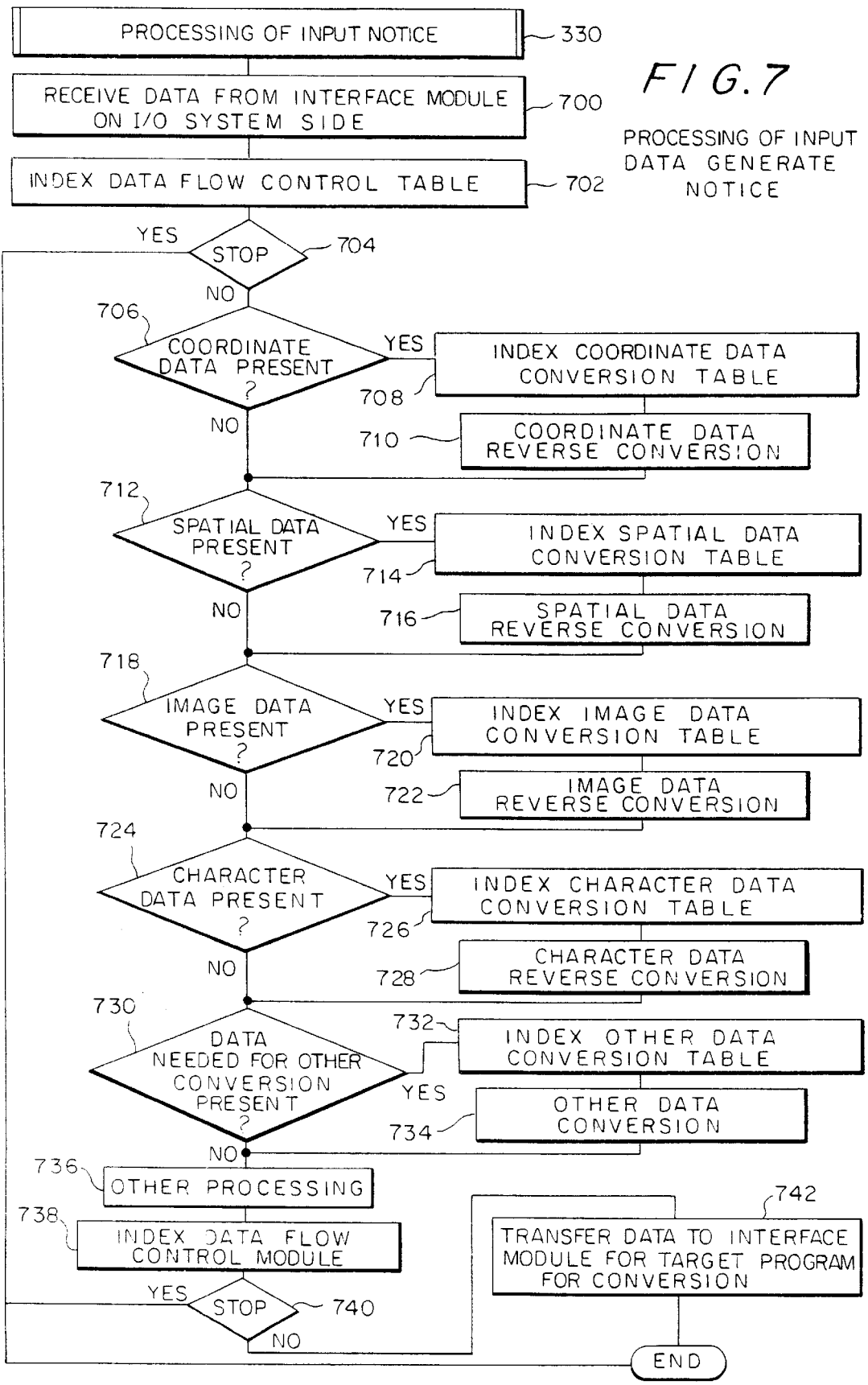
FIG. 7 is a flow chart showing the method for processing the input data notice.

The method by which this system 200 processes the input data notice is shown in the flow chart of FIG. 7.

First, the input data notice is received (700) from the I/O system side of the interface module 220. The data flow control table 222 is indexed (702) in order to determine the processing sequence. Once continuation of processing is determined (704) the subsequent input data notice is analyzed. When the command includes coordinate data (706), the coordinate data conversion table 224 is indexed (708) and that coordinate data is converted in reverse according to the indexing results (710). When the command includes spatial data (712), the spatial data conversion table 226 is indexed (714) and the spatial data then converted in reverse according to these results (716). When the command includes image data (718), the image data conversion table 228 is indexed (720) and the image data then converted in reverse according to those results (722). When the command includes character data (724), the image data conversion table 230 is indexed (726) and the image data then converted according to those results (728). When this command includes other required data (730), the other data conversion table 232 is indexed (732) and the data then converted according to those results (734). When the above conversion is complete other necessary processing is performed (736). Thus the data flow control table 222 is indexed (738) and when further processing is set (740), the display output graphics command is transferred (742) to the I/O system side of the interface module 208.

For other processing (334), data is taken from the I/O system side of the interface module 208 or the I/O of the interface module 220 and conversion or reverse conversion performed in the same way as related above for the display output graphics command and input data notice. This converted or reverse converted data is then transferred to the interface module 208 or the I/O system side of the interface module 220.

Figure 8:
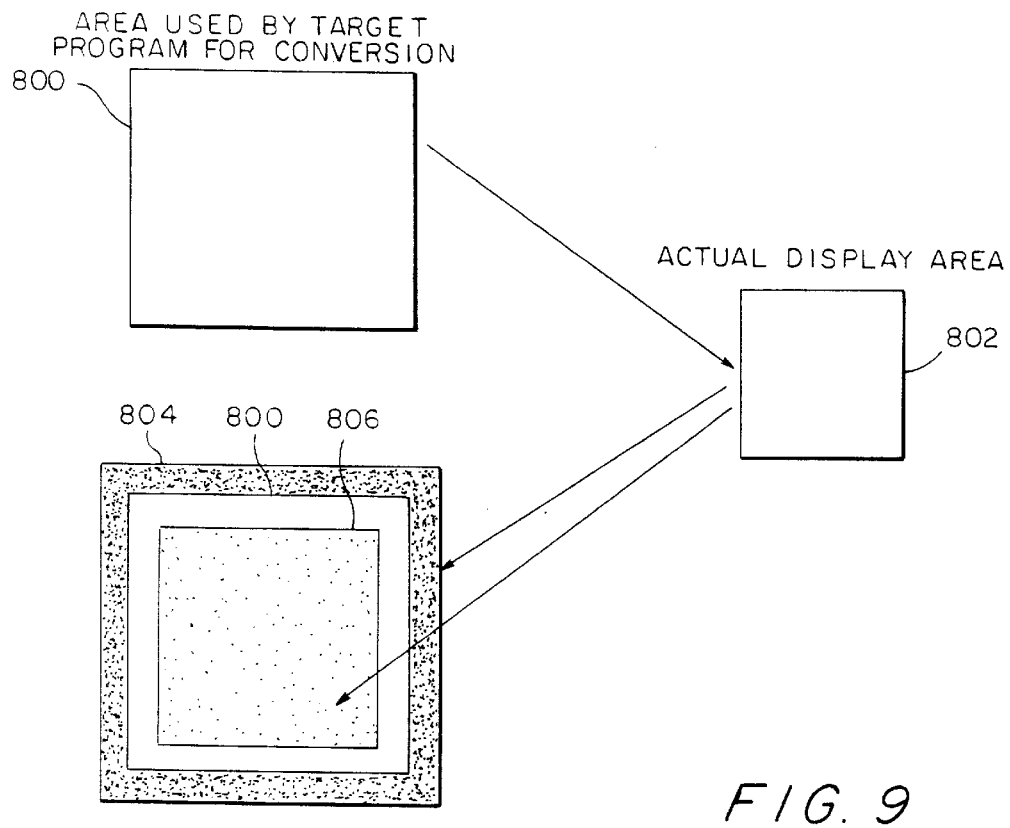
FIG. 8 is a drawing showing a typical problem accompanying window changes.

FIG. 8 shows one possible example when coordinates of a changed window are conveyed to the program. The coordinate system of the display unit 100 is indicated by pixel units expressed in integers so that in many cases the individual converted coordinates on the changed window do not correspond to their previous values. This problem makes it necessary to employ various methods according to the status at these individual coordinates. The figure shows the status when the size of the window has been shrunk when changed. The area 800 is the rectangle formed in the program 202.

In this system 200, the rectangle area 800 is for instance handled for display as a reduced rectangle area 802 by the I/O system program 204 on the screen. When it becomes necessary to redisplay the area on the screen taken up by the reduced rectangle area 802, the area redisplayed by this system 200 in response to the program 202 may not agree with the original status. An intermediate size between the reduced rectangle areas 804 and 806 may have to be used to implement the conversion of the reduced image to match the reduced rectangle area 802 according to the size ratios of reduced rectangle areas 800 and 802. In this kind of case, the largest available rectangle area 804 is utilized based on the fact that the system 200 may be unable to provide sufficient data. This allows avoiding the problem of not being able to show in area 802, the image data included in the gap rectangle areas 804 and 806.

To further illustrate this type of problem, when for example a pixel with a width of 1 is reduced to one-fourth of its former size the actual width of the pixel on the screen becomes 0.25 and under certain conditions may not appear on the screen. In this system 200 a pixel width that drops below a minimum integer value is changed into a preset value stored in the spatial data conversion table 226. As a further example, even when a changed window is displayed, the position in the I/O system 204 more specifically, the same coordinate values for a point in the upper left corner are changed in the same way, so there is no need to move positions. The necessary information is stored in the coordinate data conversion table 224. Of course this kind of custom conversion and these presettings merely amount to just one example and different instructions are also allowed.

Figure 9:
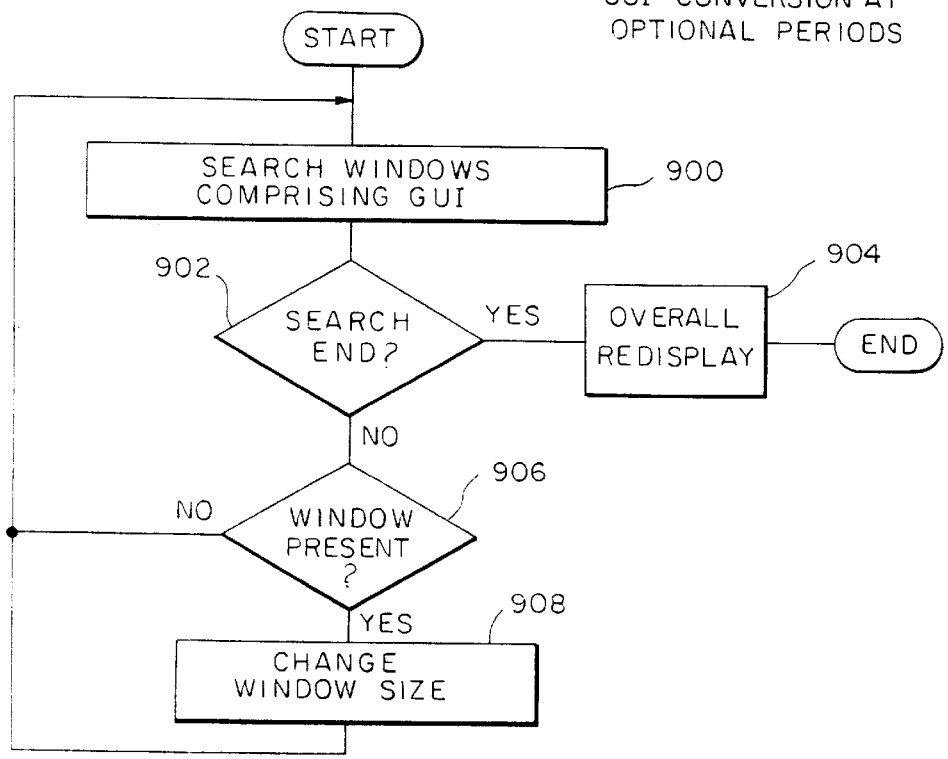
FIG. 9 is a flow chart showing processing of changes in the program display.

The process by which this system 200 changes the window size along with the display contents during execution of the display by the GUI target program 202 is shown in the flow chart of FIG. 9. The processing in FIG. 9 is implemented with the same hardware configuration as for FIGS. 3, 6, 7. First, this system 200 obtains the window system interface data for implementation. The processing when utilizing the I/O device interface is described later. When changing of a window of any of the computers is instructed, this system 200 searches the windows comprising the GUI program 202 one after another (900). When this window is found (906) it is changed into a value for a specified window size (908). When changing the size of all windows comprising the program (202) has been completed (902), all window displays utilized by program 202 are changed or redisplay is instructed (904). Consequently, the display output graphics command issued by the program 202 is changed into the shape specified by this system 202 and then sent to the I/O system 204 for the specified display output just as was described in the embodiment.

When utilizing the input/output system interface, there are no windows comprising the display of the program 202 on the I/O system 204 so after registering the new change processing in the program 202, all window displays utilized by program 202 are changed or redisplay is instructed (904).

This invention therefore allows freely changing the external view shown on each program's display unit without having to change the program, by means of a user interface ideal for use with the computer and for achieving the object of the invention.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. A computer system, comprising:
a first computer which executes a first input/output system program which displays output according to a display output command from an application program on a first window and sends input according to a notice of generation of input through a second window for said application program to said application program;
a second computer which executes a second input/output system program which displays said output on a third window having specifications which are different from those of said first window, and sends input, which is inputted through a fourth window having specifications which are different from those of said second window, to said application program; and
a third computer which executes a change program which modifies said display output command, which is appropriate for the specifications of said first window to be appropriate for the specifications of said third window so that said modified display output command causes said second input/output system program to display said output appropriately, and modifies a notice of generation of input, which is appropriate for the specifications of said fourth window to be appropriate for the specifications of said second window, so that said modified notice of generation of input causes said application program to receive an input appropriately.

2. A computer system according to claim 1, wherein said first window and said second window are the same and said third window and said fourth window are the same.

3. A computer system according to claim 1, wherein said change program comprises:
an output change function which receives said display output command issued for said first window of said first input/output system program from said application program, and modifies data in said output command, the data being appropriate for said specifications of said third window of said second input/output system program; and
an input change function which receives said notice of generation of input inputted through said fourth window from said second input/output system program, and modifies data in said notice of generation of input, for being appropriate for said specifications of said second window of said first input/output system program.

4. A computer system according to claim 3, wherein said change program comprises at least one conversion table used for modifying data in said display output command and said modified notice of generation of input data.

5. A computer system according to claim 4, wherein said conversion table is one of a control data conversion table, a spatial data conversion table, an image data conversion table and a character data conversion table.

6. A computer system according to claim 5,
wherein said output change function uses a predetermined value as a size of modified display command when said size is less than a predetermined threshold value in shrinking said display output command which is appropriate for said specifications of said first window to be appropriate for said specifications of said third window.

7. A computer system according to claim 1, further comprising:
a fourth computer which executes a third input/output system program which displays output from said application program on a fifth window with specifications which are different from those of said first window, and sends input, which is inputted through a sixth window with specifications which are different from those of said second window, to said application program; and
wherein said change program
further changes said output, which is appropriate for the specifications of said first window output from said application program, to an output which is appropriate for the specifications of said fifth window, and
changes said input, which is appropriate for the specifications of said sixth window output from said third input/output system program, to an input which is appropriate for the specifications of said second window.

8. A computer system according to claim 1,
wherein said first computer and said third computer are the same.

9. A computer system according to claim 3,
wherein said output change function outputs said modified display output command to said second input/output system program; and
wherein said input change function outputs said modified notice of generation of input to said application program.

10. A computer program stored on a storage medium which operates between an application program and a first input/output system program, said computer program causes said computer to perform the steps of:
modifying a display output command, which is appropriate for specifications of a first window generated by said first input/output system program, to be appropriate for specifications of a third window generated by a second input/output system program, said third window having specifications which are different from those of said first window so that said modified display output command causes said second input/output system program to appropriately display said output on said third window; and
modifying a notice of generation of input, which is appropriate for specifications of a fourth window generated by said second input/output system program, said fourth window having specifications which are different from those of a second window generated by said first input/output system program, to be appropriate for the specifications of said second window so that said modified notice of generation of input causes said application program to receive an input appropriately;
wherein said steps of modifying a display output command and modifying a notice of generation of input are independent of each other.

11. A computer program according to claim 10,
wherein said step of modifying a display output command includes the sub-steps of:
receiving the display output command issued for said first window from said application program, and
generating a modified display output command which is appropriate for said specification of said third window; and
wherein said step of modifying a notice of generation of input includes the sub-steps of:
receiving the notice of generation of input inputted through said fourth window from said second input/output system program, and
generating a modified notice of generation of input which is appropriate for said specification of said second window by said first input/output system program.

12. A computer program according to claim 11, wherein said steps of generating a modified display output command and generating a modified notice of generation of input use at least one conversion table for generating said modified display output command and said modified notice of generation of input, respectively.

13. A computer program according to claim 12,
wherein said conversion table used in said generating step is one of a control data conversion table, a spatial data conversion table, an image data conversion table and a character data conversion table.

14. A computer program according to claim 13, wherein said step of modifying a display output command includes the sub-step of:
using a predetermined value as a size of modified display output command when said size is less than a predetermined threshold value in shrinking said display output command which is appropriate for the specifications of said first window to be appropriate for the specifications of said third window.

15. A computer program according to claim 11, wherein said step of modifying a display output command includes the sub-step of:
output said modified output command to said second input/output system program; and
wherein said step of changing an input includes the sub-step of:
outputting said modified notice of generation of input to said application program.

16. A computer program according to claim 15,
wherein said storage medium is included in a server connected to a network which is connected to a plurality of computers; and
wherein said server transfers said computer program stored on said storage medium to said computers connected to said network.

17. A computer on which a program operates in cooperation with an application program being executed by a second computer, wherein a first input/output system program is also being executed on said second computer, and a second input/output system program is being executed on a third computer, said computer comprising:
a processor;
a memory for storing said program to be executed by the processor;
wherein said processor when executing said program performs the steps of:
modifying a display output command, which is appropriate for specifications of a first window generated by said first input/output system program, to be appropriate for specifications of a third window generated by said second input/output system program, said third window having specifications which are different from those of said first window so that said modified display output command causes said second input/output system program to appropriately display said output on said third window; and modifying a notice of generation of input, which is appropriate for specifications of a fourth window generated by said second input/output system program, said fourth window having specifications which are different from those of a second window generated by said first input/output system program, to be appropriate for the specifications of said second window so that said modified notice of generation of input causes said application program to receive an input appropriately; and wherein said steps of modifying a display output command and modifying a notice of generation of input are independent of each other.

18. A computer according to claim 17, wherein said first window and said second window are the same and said third window and said fourth window are the same.

19. A computer according to claim 17, wherein said step of modifying a display output command includes the sub-steps of:

receiving the display output command issued for said first window from said application program, and generating the modified display output command which is appropriate for the specifications of said third window; and wherein said step of modifying a notice of generation of input includes the sub-steps of:

receiving the notice of generation of input inputted through said fourth window from said second input/output system program, and generating the modified notice of generation of input which is appropriate for the specifications of said second window by said first input/output system program.

20. A computer according to claim 19, wherein said memory stores at least one conversion table which has information used for generating modified display output commands and modified notice of generation of input.

21. A computer according to claim 20, wherein said conversion table is one of a control data conversion table, a spatial data conversion table, an image data conversion table and a character data conversion table.

22. A computer according to claim 21, wherein said step of modifying a display output command uses a predetermined value as a size of modified display output command when said size is less than a predetermined threshold value in shrinking said display output command which is appropriate for said specifications of said first window to be appropriate for said third window.

23. A computer according to claim 19, wherein said step of modifying a display output command includes the sub-step of:

outputting said modified display output command to said second input/output system program; and wherein said step of modifying a notice of generation of input includes the sub-step of:

outputting said modified notice of generation of input to said application program.

24. A method for sharing an application program between a plurality of computers, said computers execute a first input/output system program and a second input/output system program respectively, said method comprising the steps of:

modifying a display output command, which is appropriate for specifications of a first window generated by said first input/output system program, to be appropriate for specifications of a third window generated by said second input/output system program, said third window having specifications which are different from those of said first window so that said modified display output command causes said second input/output system program to display said output on said third window appropriately; and modifying a notice of generation of input, which is appropriate for specifications of a fourth window generated by said second input/output system program, said fourth window having specifications which are different from those of a second window generated by said first input/output system program, to be appropriate for the specifications of said second window so that said modified notice of generation of input causes said application program to receive an input appropriately;

wherein said steps of modifting a display output command and modifying a notice of generation of input are independent of each other.

25. A method according to claim 24, wherein said step of modifying a display output command includes the sub-steps of:

receiving the display output command issued for said first window from said application program, and generating a modified output display command which is appropriate for the specifications of said third window; and wherein said step of modifying a notice of generation of input includes the sub-steps of:

receiving the notice of generation of input inputted through said fourth window from said second input/output system program, and generating a modified notice of generation of input which is appropriate for the specifications of said second window by said first input/output system program.

26. A method according to claim 25, wherein said steps of generating a modified display output command and generating a modified notice of generation of input use at least one conversion table for generating said modified display output command and said modified notice of generation of input, respectively.

27. A method according to claim 26, wherein said conversion table used in said steps of modifying a display output command and modifying a notice of generation of input is one of a control data conversion table, a spatial data conversion table, an image data conversion table and a character data conversion table.

28. A method according to claim 27, wherein said step of generating a modified display output command includes the sub-step of:

using a predetermined value as a size of modified display output command when said size is less than a predetermined threshold value in shrinking said display output command which is appropriate for the specifications of said first window to be appropriate for the specifications of said third window.

29. A method according to claim 25, wherein said step of modifying a display output command includes the sub-step of:
outputting said modified display output command to said second input/output system program; and
wherein said step of modifying a notice of generation of input further includes the sub-step of:
outputting said modified notice of generation of input to said application program.

30. A computer system comprising:
a first computer which executes a first input/output system program which displays output according to a display output command from an application program on a first window and sends input according to a notice of generation of input through a second window for said application program to said application program;
a second computer which executes a second input/output system program which displays output on a third window with specifications which are different from those of said first window, and sends input, which is inputted through a fourth window with specifications which are different from those of said second window, to said application program; and
a third computer which executes a change program which comprises:
a function for modifying said display output command, which is appropriate for the specifications of said first window to be appropriate for the specifications of said third window so that said modified display output command causes said second input/output system program to display said output appropriately; and
a function for modifying said notice of generation of input, which is appropriate for the specifications of said fourth window to be appropriate for the specifications of said second window so that said modified notice of generation of input causes said application program to receive input appropriately.

31. A computer system according to claim 30,
wherein said first window and said second window are the same and said third window and said fourth window are the same.

32. A computer system according to claim 30,
wherein said function for modifying a display output command comprises:
a function for receiving the display output command issued for said first window of said first input/output system program from said application program; and
a function for modifying the display output command which is appropriate for the specifications of said third window of said second input/output system program; and
wherein said function for modifying a notice of generation of input comprises:
a function for receiving the notice of generation of input inputted through said fourth window from said second input/output system program; and a function for modifying the notice of generation of input which is appropriate for the specifications of said second window of said first input/output system program.

33. A computer system according to claim 32, wherein said change program comprises at least one conversion table used for generating said modified display output command and said modified notice of generation of input data.

34. A computer system according to claim 33,
wherein said conversion table is one of a control data conversion table, a spatial data conversion table, an image data conversion table and a character data conversion table.

35. A computer system according to claim 34, wherein said function for modifying a display output command uses a predetermined value as a size of modified display output command when said size is less than a predetermined threshold value in shrinking said display output command which is appropriate for the specifications of said first window to be appropriate for the specifications of said third window.

36. A computer system according to claim 30, further comprising:
a fourth computer which executes a third input/output system program which displays output from said application program on a fifth window with specifications which are different from those of said first window, and sends input, which is inputted through a sixth window with specifications which are different from those of said second window, to said application program; and
wherein said change program further comprises:
a function for changing said display output command, which is appropriate for the specifications of said first window output from said application program, to a display output command which is appropriate for the specifications of said fifth window, and
a function for changing said notice of generation of input, which is appropriate for the specifications of said sixth window output from said third input/output system program, to a notice of generation of input which is appropriate for the specifications of said second window.

37. A computer system according to claim 30,
wherein said first computer and said third computer are the same.

38. A computer system according to claim 32,
wherein said function for modifying a display output command further comprises:
a function for outputting said modified display output command to said second input/output system program; and
wherein said function for changing an input further comprises:
a function for outputting said modified notice of generation of input to said application program.

* * * * *